(12) United States Patent
Rothmund et al.

(10) Patent No.: US 12,333,705 B2
(45) Date of Patent: Jun. 17, 2025

(54) METHOD AND APPARATUS FOR ANALYZING A PRODUCT, TRAINING METHOD, SYSTEM, COMPUTER PROGRAM, AND COMPUTER-READABLE STORAGE MEDIUM

(71) Applicant: Fujitsu Technology Solutions GmbH, Munich (DE)

(72) Inventors: Felix Rothmund, Munich (DE); Simran Agarwal, Munich (DE); Leslie Casas, Munich (DE); Keng Chai, Munich (DE); Markus Bößl, Munich (DE); Shweta Mahajan, Munich (DE); Jonathan Pirnay, Munich (DE); Jochen Riedisser, Munich (DE)

(73) Assignee: Fujitsu Technology Solutions GmbH, Munich (DE)

( * ) Notice: Subject to any disclaimer, the term of this patent is extended or adjusted under 35 U.S.C. 154(b) by 367 days.

(21) Appl. No.: 17/868,044

(22) Filed: Jul. 19, 2022

(65) Prior Publication Data

US 2023/0022631 A1   Jan. 26, 2023

(30) Foreign Application Priority Data

Jul. 20, 2021   (DE) ........................... 102021118711.7

(51) Int. Cl.
*G06V 10/774*   (2022.01)
*G06T 7/00*   (2017.01)
(Continued)

(52) U.S. Cl.
CPC .......... *G06T 7/0008* (2013.01); *G06T 7/0012* (2013.01); *G06V 10/26* (2022.01);
(Continued)

(58) Field of Classification Search
CPC .. G06F 18/254; G06N 3/0455; G06N 3/0895; G06N 3/094; G06T 2207/20081;
(Continued)

(56) References Cited

U.S. PATENT DOCUMENTS 11,501,195 B2 *   11/2022   Rose ...................... G06N 20/00
2010/0111396 A1 *   5/2010   Boucheron ............. G06F 18/29
382/133

(Continued)

FOREIGN PATENT DOCUMENTS

CN   108229561 A   6/2018
CN   209271946 U   8/2019
(Continued)

OTHER PUBLICATIONS

Vitjan Zavrtanik et al. , "Reconstruction by inpainting for visual anomaly detection," Oct. 17, 2020, Pattern Recognition 112 (2021) 107706,pp. 1-7.*

(Continued)

*Primary Examiner* — Omar S Ismail
(74) *Attorney, Agent, or Firm* — DLA Piper LLP (US)

(57) ABSTRACT

A method of analyzing a product includes performing an anomaly detection on a received image using an autoencoder, wherein the autoencoder includes at least one first neural network trained based on a first set of training images, and the first set of training images includes a plurality of training images each showing a corresponding defect-free product; determining, using a binary classifier, whether or not a defect is present based on a result of the anomaly detection; performing defect detection on the received image using a defect detector, wherein the defect detector includes a third neural network trained based on a one third set of training images, and the third set of training images includes a plurality of training images each showing a corresponding (Continued)

defective product; and evaluating a result based on a weighting of the results of the anomaly detection, the defect detection, and the binary classifier.

15 Claims, 2 Drawing Sheets

(51) Int. Cl.
  *G06V 10/26* (2022.01)
  *G06V 10/764* (2022.01)
  *G06V 10/82* (2022.01)
(52) U.S. Cl.
  CPC ........ *G06V 10/764* (2022.01); *G06V 10/7747* (2022.01); *G06V 10/82* (2022.01); *G06T 2207/20081* (2013.01); *G06T 2207/20084* (2013.01); *G06T 2207/30004* (2013.01); *G06T 2207/30108* (2013.01); *G06V 2201/06* (2022.01)
(58) Field of Classification Search
  CPC . G06T 2207/20084; G06T 2207/30004; G06T 2207/30108; G06T 7/0004; G06T 7/0008; G06T 7/0012; G06V 10/26; G06V 10/764; G06V 10/7747; G06V 10/82; G06V 2201/06
  See application file for complete search history.

(56) References Cited

U.S. PATENT DOCUMENTS

| | | | | |
|---|---|---|---|---|
| 2018/0322623 | A1* | 11/2018 | Memo | G06N 3/084 |
| 2019/0244513 | A1* | 8/2019 | Niculescu-Mizil | G06V 10/764 |
| 2019/0378012 | A1* | 12/2019 | Tripodi | G06N 3/08 |
| 2020/0074622 | A1* | 3/2020 | Yang | G06N 3/08 |
| 2020/0126210 | A1* | 4/2020 | Li | G06F 16/532 |
| 2020/0211189 | A1* | 7/2020 | Yip | G06V 20/69 |
| 2020/0364842 | A1* | 11/2020 | Chaton | G06N 3/04 |
| 2020/0394458 | A1* | 12/2020 | Yu | G06N 3/045 |
| 2021/0081676 | A1* | 3/2021 | Kim | G06V 20/47 |
| 2021/0118165 | A1* | 4/2021 | Strong | G06T 7/11 |
| 2021/0118166 | A1* | 4/2021 | Tremblay | G06T 7/70 |
| 2021/0304389 | A1* | 9/2021 | Li | G06F 18/2413 |

FOREIGN PATENT DOCUMENTS

| | | |
|---|---|---|
| JP | 2008-145226 | 6/2008 |
| JP | 2020-181333 | 11/2020 |
| JP | 2020-181532 | 11/2020 |

OTHER PUBLICATIONS

Loek Tonnaer et al., "Anomaly Detection for Visual Quality Control of 3D-Printed Products," Sep. 30, 2019, 2019 International Joint Conference on Neural Networks (IJCNN), Budapest, Hungary. Jul. 14-19, 2019, pp. 1-7.*
M. Haselmann et al., "Anomaly Detection using Deep Learning based Image Completion," Oct. 15, 2018, 2018 17th IEEE International Conference on Machine Learning and Applications,pp. 1237-1241.*
Jonathan Pirnay et al., "Inpainting Transformer for Anomaly Detection," May 17, 2022, Image Analysis and Processing—ICIAP 2022, pp. 394-402.*
Deepak Pathak et al., "Context Encoders: Feature Learning by Inpainting," Jun. 2016, Proceedings of the IEEE Conference on Computer Vision and Pattern Recognition (CVPR), 2016, pp. 2536-2542.*
Ramprasaath R. Selvaraju et al., "Grad-CAM: Visual Explanations from Deep Networks via Gradient-based Localization," Oct. 2017,Proceedings of the IEEE International Conference on Computer Vision (ICCV), 2017, pp. 618-625.*
Decision to Grant dated Nov. 21, 2023, of counterpart Japanese Patent Application No. 2022-115009, along with an English translation.
Japanese Examination Report dated Aug. 1, 2023, of counterpart Japanese Application No. 2022-115009, along with an English translation.
Anand Bhattad et al., "Detecting Anomalous Faces with 'No Peeking' Autoencoders," arXiv: 1802.05798v1 [cs.CV] Feb. 15, 2018.
M. Haselmann et al., "Anomaly Detection using Deep Learning based Image Completion," arXiv: 1811.06861v1 [cs.CV] Nov. 16, 2018, IEEE, 17$^{th}$ International Conference on Machine Learning and Applications (ICMLA).
Ramprasaath R. Selvaraju et al., "Grad-CAM: Visual Explanations from Deep Networks via Gradient-based Localization," arXiv: 1610.02391 v4 [cs.CV] Dec. 3, 2019.
Alexey Bochkovskiy et al., "YOLOv4: Optimal Speed and Accuracy of Object Detection," arXiv: 2004.10934v1 [cs.CV] Apr. 23, 2020.
Jonathan Pirnay et al., "Inpainting Transformer for Anomaly Detection," arXiv: 2104.13897v3 [cs.CV] Nov. 26, 2021.
Extended European Search Report dated Dec. 20, 2022, of counterpart European Patent Application No. 22185470.6, along with an English machine translation.
V. Zavrtanik et al., "Reconstruction by Painting for Visual Anomaly Detection," Pattern Recognition, 112, 107706, Elsevier, pp. 1-9, Oct. 2020.
J. Pirnay et al., "Inpainting Transformer for Anomaly Detection," arxiv.org, Cornell University Library, pp. 1-15, Sections 2.2 and 3, Apr. 2021.

* cited by examiner

METHOD AND APPARATUS FOR ANALYZING A PRODUCT, TRAINING METHOD, SYSTEM, COMPUTER PROGRAM, AND COMPUTER-READABLE STORAGE MEDIUM

TECHNICAL FIELD

This disclosure relates to a method and an apparatus for analyzing a medical product, a method of training an apparatus for analyzing a medical product, a system comprising the above apparatus and an inspection device, and a corresponding computer program and a corresponding computer-readable storage medium.

BACKGROUND

Medical products such as liquid drugs, tablets or ampules or other vials with or for liquids such as liquid vaccines or other drugs or substances commonly used in medicine, have high quality requirements during production. Among other things, it is very important to ensure that such medical products do not have any mechanical defects after production, nor are they contaminated or have any other visible impairments that could lead to such products being ineffective or posing a health risk. This applies both to the drugs themselves and to their packaging. Analogously, this also may apply to other products.

To guarantee these quality requirements, workers are employed in production to inspect the drugs, medicines, ampules and vials or other packaging or products. This requires a high level of concentration and yet is vulnerable to human error.

Therefore, it could be helpful to provide an improvement for quality control in the production of such medical products or other products.

SUMMARY

We provide a method of analyzing a product, the method including receiving an image of the product; performing an anomaly detection on the received image using an inpainting autoencoder, wherein the inpainting autoencoder comprises at least one first neural network trained based on a first set of training images, and the first set of training images comprises a plurality of training images each showing a corresponding defect-free product; determining, using a binary classifier, whether or not a defect is present based on a result of the anomaly detection; performing defect detection on the received image using a defect detector, wherein the defect detector comprises at least one third neural network trained based on at least one third set of training images, and the at least one third set of training images comprises a plurality of training images each showing a corresponding defective product; and evaluating a result of the analysis of the received image based on a weighting of the results of the anomaly detection, the defect detection, and the binary classifier.

We also provide a method of training an apparatus for analyzing a product, the method including creating a first set of training images, the first set of training images comprising a plurality of training images each showing a defect-free product; training at least a first neural network of an inpainting autoencoder based on the first set of training images; creating a binary classifier configured to identify whether or not a defect is present based on a result of an anomaly detection using the inpainting autoencoder; creating at least one third set of training images, wherein the at least one third set of training images comprises a plurality of training images each showing a defective product, and further at least one defect is marked in each training image of the third set of training images; training at least one third neural network of a defect identifier based on the at least one third set of training images; and determining a weighting by which to evaluate results of an anomaly detection by the inpainting autoencoder, a defect detection by the defect detector, and an application of the binary classifier.

Figure 1:
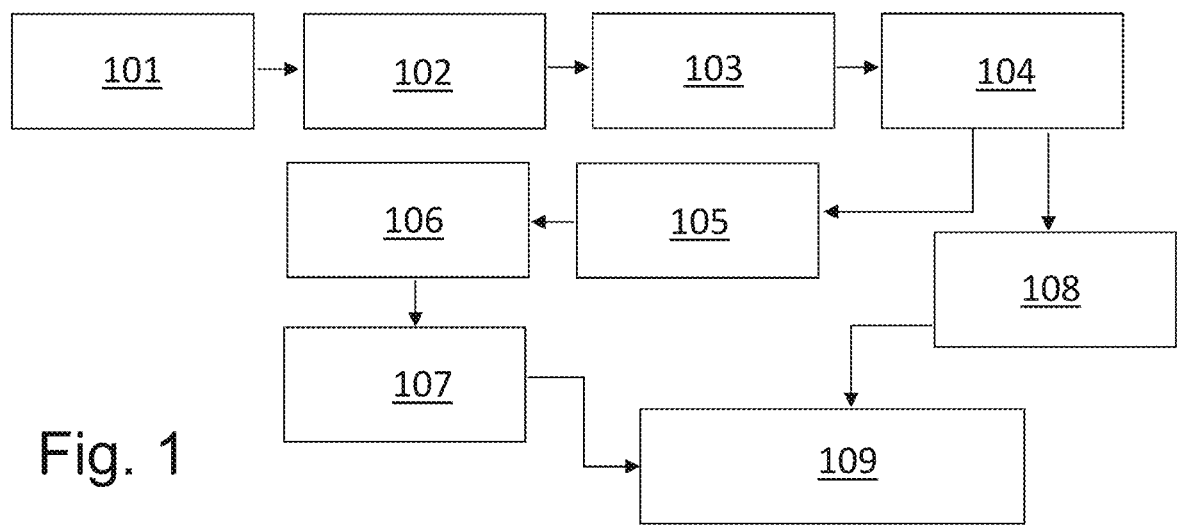
FIG. 1 shows a flowchart of a method of analyzing a medical product according to an example.

LIST OF REFERENCE SIGNS 1 system
2 inspection device
3 apparatus for analyzing a medical product
4 worker
5 conveyor belt
6 vial
7 sorting machine
8 camera
9 computer
40-45 sections
101-109 method steps
201-210 method steps

DETAILED DESCRIPTION

We provide a method of analyzing a product comprising:
receiving an image of the product;
performing an anomaly detection on the received image using an inpainting autoencoder, wherein the inpainting autoencoder comprises at least one first neural network trained based on a first set of training images, and the first set of training images comprises a plurality of training images each showing a corresponding defect-free product;
determining, using a binary classifier, whether or not a defect is present based on a result of the anomaly detection;
performing defect detection on the received image using a defect detector, wherein the defect detector comprises at least one third neural network trained based on at least one third set of training images, and the at least one third set of training images comprises a plurality of training images each showing a corresponding defective product;
evaluating a result of the analysis of the received image based on a weighting of the results of the anomaly detection, the defect detection, and the binary classifier.

Advantageously, this method enables safe and reliable automated inspection of a product. This can replace or support strenuous inspection jobs in the production of such products. In addition, a very high level of quality assurance is achieved since the anomaly detection also identifies defects as anomalies that were not previously known.

The image of the product here can be, for example, an image of a medical product, for example, an image of a drug (liquid or solid) or of such a drug in a package such as an ampule, a vial, a blister package or others. Alternatively, the image may be an image of any other product. In particular, the image may show the product itself, a packaging of the product, or a combination of both. In the following, the disclosure is mainly described with respect to a medical product, however, it can readily be derived that the same may be applied to any other type of product.

Anomaly detection involves determining whether there are any visible deviations of the medical product as depicted in the received image from a defect-free product. Such anomalies may be, for example, defects on a package or a medical product within a package, or optical deviations such as reflections, shadows, or others. Anomaly detection determines that such a discrepancy exists between the imaged medical product and an anomaly-free medical product.

In this example, the inpainting autoencoder uses the image processing method of inpainting, with which image parts can be reconstructed using the at least one first neural network. Since the at least one first neural network is trained using the first set of training data, which comprises a plurality of training images, each of which shows a defect-free medical product, i.e., each of which shows a medical product in which no anomalies are recognizable, the inpainting autoencoder can reconstruct the medical product the way it is depicted in the received image as it should look in an anomaly-free state.

An advantage here is that it is irrelevant in which position or orientation the medical product is depicted in the received image. The inpainting autoencoder reconstructs an anomaly-free equivalent of the received image with the same position or orientation, regardless of the position or orientation of the medical product. In this way, an anomaly-free equivalent is generated that can be compared to the received image.

An advantage of using the binary classifier is that it can determine, if a discrepancy between the medical product in the received image and the anomaly-free equivalent to the received image reconstructed with the inpainting autoencoder has been detected during anomaly detection, whether the detected anomaly is to be considered a defect or not. In this context, an anomaly that can negatively affect a quality of the medical product, for example, damage or faulty closure of the packaging, contamination of the drug, too low or too high filling level or the like, can be considered as a defect. For example, an anomaly that is not a defect may be one that does not negatively affect the quality of the medical product such as a reflection or shadow in the received image.

The binary classifier can be based, for example, on a second neural network as described below, or on other methods of interpreting the difference image created using the inpainting autoencoder. For example, rule-based methods can also be used for the binary classifier to determine whether or not an anomaly is to be recognized as a defect.

In this way, it is possible to use the anomaly detection and the following binary classifier to determine whether an anomaly is present and whether it is to be considered a defect or not. A further advantage is that the at least one first neural network can be trained with training images that do not show any defects, but only defect-free images or with anomalies that are not to be considered defects. Defective training images are very rare in the production of medical products since the production of medical products is already based on very high quality standards. However, defect-free training images can be collected in large numbers. Therefore, it is advantageous here to train the at least one first neural network based on defect-free training images. For example, the at least one first neural network is trained exclusively based on defect-free training images.

For example, the defect detector is configured to recognize a type of defect and/or a location of a defect and/or a defect probability on the received image of the medical product. For this purpose, the at least one third neural network is trained based on training images showing corresponding defective medical products. Thus, it is possible for the defect detector to recognize defects that are known to it from the training data. For this purpose, an object recognition method such as a you-only-look-once model (YOLO model) is used.

For example, percentage weights of the results of anomaly detection, binary classifier, and defect detection are used to evaluate the result of the analysis of the received image. In other words, a weighting is given to each of the analysis steps by which a certain probability that it is an actual defect is incorporated into a final result of the analysis. With the combination and weighting of these analysis steps, it is possible to achieve reliable and accurate results in the machine quality control of medical products, even if, for training purposes of the various neural networks, only a very small number of training data are available that show medical products that are actually defective and need to be sorted out, compared to training data that show no defect.

To perform the anomaly detection, the received image may be divided into at least two sub-images. The anomaly detection may be performed on the individual sub-images and the binary classifier may be applied to the results of the anomaly detection of the individual sub-images.

Advantageously, a processing time for anomaly detection and application of the binary classifier can be reduced by possible parallelization. This enables a cheaper and more practical analysis for real-time applications, for example, when high analysis rates are to be achieved. For example, 100 or more medical products can be analyzed per minute, which is advantageous in modern production lines.

When determining, by the binary classifier, based on a result of the anomaly detection whether a defect is present or not, the binary classifier may evaluate, based on a reconstruction error of a version of the received image reconstructed by the inpainting autoencoder, whether the medical product represented in the received image is to be evaluated defective or defect-free.

This enables easy creation of the binary classifier, as well as that a processing time and required computing power for the binary classifier can be kept low. Further, the binary classifier advantageously supports evaluation using the inpainting autoencoder to determine defects in the received image.

The binary classifier may comprise at least one second neural network trained based on a second set of training images. The second set of training images may comprise results of the inpainting autoencoder.

In this example, the binary classifier comprises at least one second neural network, wherein the at least one second neural network is a smaller neural network compared to the at least one first neural network. The at least one second neural network is trained based on a substantially smaller set of training data than the at least one first neural network.

The at least one second neural network of the binary classifier is trained for this purpose based on training images comprising results of the inpainting autoencoder. In other words, the at least one second neural network is trained based on training images showing reconstruction errors, i.e., discrepancies between an original image and a reconstructed counterpart. Additionally or alternatively, for training the at least one second neural network, only those inpainting autoencoder results obtained from training images showing labeled defective and defect-free medical products may be used.

An attention map of the at least one second neural network may further be generated when applying the binary classifier.

An advantage here is that by the attention map, i.e., by considering at which points of the received image the at least one second neural network has a higher activity, a localization of detected anomalies is possible. Thus, it is further possible, also depending on the locality of detected anomalies, to influence the determination of whether or not it is a defect. For example, anomalies in areas of the medical product where reflections occur more frequently such as an area of a bottle neck in a vial, may be evaluated differently than anomalies occurring in areas where reflections occur more seldomly.

We also provide a method of training a device for analyzing a product comprising:
  creating a first set of training images, the first set of training images comprising a plurality of training images each showing a defect-free product;
  training at least one first neural network of an inpainting autoencoder based on the first set of training images;
  creating a binary classifier configured to identify whether or not a defect is present based on a result of an anomaly detection using the inpainting autoencoder;
  creating at least one third set of training images, wherein the at least one third set of training images comprises a plurality of training images each showing a defective product, and wherein further at least one defect is marked in each training image of the third set of training images;
  training at least one third neural network of a defect detector based on the at least one third set of training images; and
  determining a weighting according to which results of an anomaly detection using the inpainting autoencoder, a defect detection using the defect detector and an application of the binary classifier are to be evaluated.

The product may be a medical product.

Advantageously in this training method, training data based on images showing defect-free medical products can be used to train the at least one first neural network as described above. This is particularly advantageous if a high quality standard is already maintained in production so that defective products are present only in comparatively very small numbers. Only for the at least one third set of training images, training images showing defective medical products are used here. However, since this training data is only available in small numbers when analyzing with such a trained system, the at least one third neural network is assisted by the at least one first neural network and the binary classifier in determining whether a medical product is defective or not. In this way, an apparatus trained in this manner can detect defective medical products with high accuracy and reliability.

Creating the binary classifier may comprise:
  creating a second set of training images, wherein the second set of training images comprises results of the inpainting autoencoder; and
  training at least one second neural network of the binary classifier based on the second set of training images.

The second set of training images comprises inpainting autoencoder results generated based on images of defect-free and/or defective, labeled medical products. Since the at least one second neural network is substantially smaller than the at least one first neural network, a smaller number of training images is sufficient to train the at least one second neural network, in which images of both defect-free and defect-labeled medical products may be present.

The method of training may further comprise:
  creating a further third set of training images, wherein the further third set of training images comprises both a plurality of training images each showing a defective medical product and a plurality of training images each showing a defect-free medical product, and wherein the training of the at least one third neural network is additionally performed based on the further third set of training images.

An advantage here is that a defect detection by the defect detector becomes more reliable and more accurate.

The method of training further may comprise:
  creating a still further third set of training images, wherein the still further third set of training images comprises a plurality of training images each showing a defect-free medical product that has been detected as defective by the previously trained at least one third neural network, and wherein the training of the at least one third neural network is additionally performed based on the still further third set of training images.

An advantage here is that a defect detection by the defect detector becomes even more reliable and accurate.

Training the at least one first neural network of the inpainting autoencoder based on the first set of training images may further comprise:
  patchwise reconstructing a training image of the first set of training images;
  adding, for a plurality of reconstructed patches, an edge region from a corresponding part of the original training image; and
  training the at least one first neural network of the inpainting autoencoder using the reconstructed patches of the training image, taking into account the added edge regions.

This is advantageous since in this way artifacts that may be caused by the reconstruction in a patch-by-patch reconstruction at the edges of the respective patches and that may be detrimental in the further processing of the anomaly detection results can be reduced or avoided. In particular, such artifacts may occur at the edges of such patches, which may result in an unwanted checkerboard pattern in the reconstructed image.

By adding edge regions to the reconstructed patches, the at least one first neural network is trained to reconstruct the patches at the edge regions to be as similar as possible to the original image when training the same, thereby reducing or avoiding the unwanted checkerboard pattern. The edge regions, for example, a frame around each patch in a width of a few pixels, is taken from the original image and added to each reconstructed patch accordingly. In other words, the at least one neural network is fixed in the edge regions of the respective patches during training.

By training the at least one first neural network in this way, taking into account the added edge regions, it can be ensured that such checkerboard patterns are avoided or at least reduced since during subsequent reconstruction, during analyzation of a received image, the inpainting autoencoder reconstructs the edge regions of the patches as close to the original as possible. The patch-by-patch reconstruction and the adding of the edge regions can be performed for a plurality or all of the training images of the first set of training images. The plurality of reconstructed patches to which an edge region of the original image is added may be a plurality or all of the reconstructed patches in the patch-wise reconstruction. Alternatively or additionally, overlapping patches may be used in the reconstruction to create homogeneous transitions between the patches.

The above methods are computer-implemented methods.

We still further provide an apparatus that analyzes a product and is adapted to perform our methods. The product may be a medical product or any other product.

Advantageously, the apparatus further comprises an imaging device for capturing the image of the medical product.

The apparatus may further comprise a control device adapted to cause a medical product detected as defective to be sorted out.

An advantage is that not only the detection of defects can be performed by machine, but also a sorting out of a product detected as defective can be triggered by machine.

The apparatus may be adapted to be retrofitted to a semi-automatic inspection device.

Such a semi-automatic inspection device is designed, for example, for a person to sit at the inspection device and inspect passing medical products for defects. If a defective product is detected by the person, the person can trigger a sorting out of the defective product, for example, via a foot switch or gesture recognition.

An advantage of a retrofittable solution of the apparatus for analyzing medical products is that such a semi-automatic inspection device can be additionally or alternatively equipped and operated with the mechanical defect detection. This provides a cost-effective and flexible solution for analyzing medical products.

We still further provide a system of analyzing a product comprising the apparatus above and an inspection device. The product may be a medical product or any other product.

We yet further provide a computer program comprising instructions that, when the computer program is executed by a computer, cause the computer program to execute our methods.

We still yet further provide a computer readable storage medium comprising the computer program.

Examples as well as advantages mentioned with respect to at least one of the above-mentioned aspects can of course be used or occur analogously with respect to the other aspects. All examples described with respect to a medical product in this application may equally be applied to an analyzing of any other type of product.

Further advantages are described in the following figures as well as disclosed in the appended claims.

FIG. 1 shows a flowchart of a method of analyzing a medical product according to an example. In the following, examples relating to the analysis of a vial of a liquid drug are described. Alternatively, however, the examples described herein can of course also be used for any other medical product. For the purposes of this application, medical product means both the drugs themselves, as well as packaging for drugs, as well as the combination of drugs in corresponding packaging. Further alternatively, the image may be any other image of a product produced in a production process. In particular, the image may show the product itself, a packaging of the product, or a combination of both. It can readily be derived that the same features described with respect to analyzing of a medical product in the following may be applied to any other type of product.

In a step 101, an image of a vial filled with a liquid drug is captured. This is an RGB photograph of the vial. Alternatively or additionally, other or further images such as infrared images, X-ray images, black-and-white images and the like can of course also be captured.

In a step 102, the captured image is received by an apparatus for analyzing the medical product.

In a step 103, an object to be analyzed is detected in the received image. For example, if the received image shows the medical product to be analyzed in a production environment such as on an assembly line where a plurality of such medical products pass in front of a camera, this step detects where in the image the to be analyzed medical product is precisely located.

Alternatively or additionally, it is also possible to detect a specific area of a medical product if this area in particular is to be analyzed. For example, if only a closure of the vial is to be examined, it is possible to determine where the corresponding area is located in the received image.

Alternatively, however, the image in step 101 may already have been acquired such that the image exclusively shows the vial to be analyzed or an area to be analyzed so that the object detection in this step can be skipped.

For example, object detection methods commonly used in image processing may be used for the object detection described herein.

In a step 104, the received image is preprocessed. For example, the image is cropped, especially if only a certain area was recognized as relevant in step 103. It is also possible, for example, to perform gamma correction or other image processing measures on the image. Alternatively, however, an image may already have been received in step 102 which has both a suitable image section and a suitable image quality, without the image being preprocessed.

In a step 105, an anomaly detection with an inpainting autoencoder is performed on the received and optionally preprocessed image. The inpainting autoencoder is arranged to reconstruct the image patch by patch. For this purpose, the inpainting autoencoder comprising at least one first neural network, which is trained based on training data each showing a corresponding error-free vial. This is described in more detail below with reference to FIG. 2. Accordingly, the inpainting autoencoder is trained to reconstruct patchwise parts of the image such that they show an error-free and anomaly-free part of the vial corresponding to the patch.

For this purpose, one patch at a time is successively blackened in the received image, which is then reconstructed using the inpainting autoencoder. Since the reconstruction of the individual patches is not dependent on each other, it is also possible to perform the reconstruction of the individual patches in parallel. The reconstructed patches can then be reassembled to form a reconstructed overall image. For example, a total of 48 patches are thus reconstructed sequentially or in parallel. For example, the received image to be reconstructed patch by patch is 256 pixels or less in both height and width.

Reconstructing the received image can also be performed multiple times to obtain better reconstructed images.

After reconstruction using the inpainting autoencoder, the reconstructed image is compared with the received, optionally preprocessed, image. The so-called reconstruction error is determined. If the received, optionally preprocessed, image already shows a vial in which there are no anomalies, i.e., neither defects such as scratches, incorrect fill level or similar, nor optical artifacts such as reflections or shadows, then the received, optionally preprocessed image and the reconstructed image are essentially the same. In this example, the comparison between the images will not reveal any significant anomalies. However, if such anomalies are present in the received, optionally preprocessed, image, they are removed in the reconstructed image, and the comparison of the images shows a difference that is detected as an anomaly during anomaly detection.

The result of anomaly detection includes an anomaly value (or anomaly score). The higher the anomaly score, the more likely it is that an actual anomaly is present on the bottle.

In addition, it is also possible to perform the anomaly detection in step 105 separately on partial images of the received image. For example, the received image of the vial is divided into three parts: a first part showing a closure of the vial, a second part showing a neck of the vial—in this area, for example, there is also an upper edge of a drug in the vial at an optimal fill level—and into a third part in which there is a lower area of the vial. On the one hand, this can reduce a processing time of the anomaly detection, which improves a real-time applicability of the method, especially in production lines where fast, many vials have to be analyzed. Furthermore, higher resolutions can be utilized in examined images, leading to more accurate anomaly detection results. In addition, it is possible to evaluate different areas of the vials differently during anomaly detection. For example, if it is known that reflections frequently occur in the area of the neck of the vial, but these reflections are not to be evaluated as a defect but merely as a non-interfering anomaly, then higher anomaly values can be tolerated in this area, for example.

In a step 106, a binary classifier is applied to the result of the anomaly detection, i.e., to the matching of the reconstructed image with the received image. In this example, the binary classifier comprises at least a comparatively small second neural network trained to detect non-perturbative anomalies. For example, the binary classifier detects reflections or shadowing, which however do not affect a quality of the medical product. The at least one second neural network is, for example, at least one convolutional neural network (CNN).

By the binary classifier, it can thus be determined whether the detected anomaly, i.e., the detected reconstruction error, is an actual defect or not. Thus, the binary classifier can be used to decide whether the vial imaged is a good vial or a vial to be discarded. A probability is determined as to whether or not it is a known anomaly, i.e., a harmless reflection or shadow. If the binary classifier does not know the anomaly, the probability is high that it is a harmful anomaly. For this purpose, threshold values are set, for example, with respect to the determined probabilities as of when an anomaly is to be considered harmless or as of when it is to be considered harmful.

In a step 107, an attention map of the binary classifier, i.e., of the at least one second neural network, is generated. In this way, it can be determined which part in the representation of the reconstruction error led to a vial being determined as "bad," for example, and thus a location of the anomaly or defect can be determined. Gradient Based Class Activation Map (Grad-CAM) technology can be used for this purpose, for example. In particular, this involves analyzing, for example, the last step of the convolutions of the neural network to determine where the gradient of the last layer is greatest for determining whether or not a defect is present.

In a step 108, a defect detection is performed on the received and optionally preprocessed image. The defect detection is based on at least a third neural network, which in the example shown here is trained based on a total of three training data sets. This is described in more detail with reference to FIG. 2.

In defect detection, defects known to the at least one third neural network are detected and localized in the received image. A bounding box is drawn around the detected defect and the defect type, which is also determined by the at least one third neural network, is assigned to the corresponding bounding box. A network architecture for object detection and localization, for example, a You-Only-Look-Once model (YOLO model), can be used. In particular, a YOLOv4 model can be used here. Defect detection also determines a probability with respect to a detected defect, indicating how certain the at least one third neural network is that it is a defect.

In the example, the defect detection is applied to the entire received, optionally preprocessed, image. Alternatively, however, it is of course also possible, as in anomaly detection, to divide the image into several parts.

In a step 109, an evaluation of the analysis of the vial is performed. The respective probabilities determined by the anomaly detection, the binary classifier and the defect detection are weighted against each other. These weights can be chosen, depending on the application, to achieve the best possible and appropriate result in the analysis.

For example, the reconstruction error determined during anomaly detection is first weighted against a result from the binary classifier to determine if and where a defect or else innocuous anomaly exists. Subsequently, in the example, this result is weighted against the defect detection result. Subsequently, depending on how threshold values for the individual weightings are distributed, it can be determined whether the vial depicted in the captured image is to be sorted out or not. If the image has been divided into multiple image parts for anomaly detection, this evaluation can be performed for each part, and then it can be determined that, for example, if one of the three image parts has been evaluated as poor, the vial should be sorted out.

Figure 2:
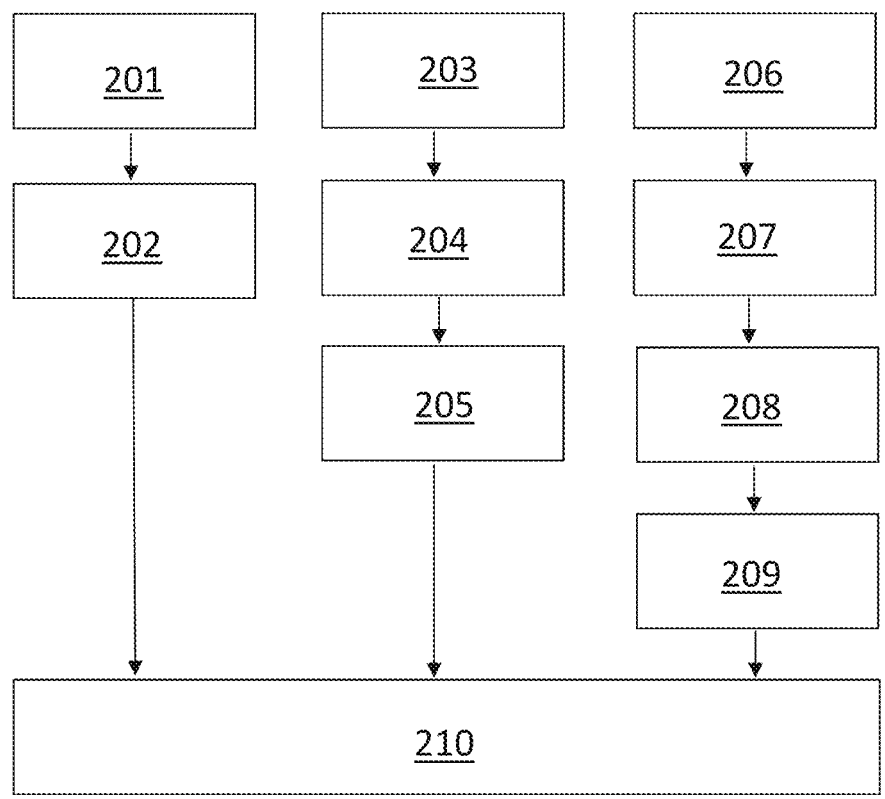
FIG. 2 shows a flowchart of a method of training a device for analyzing a medical product.

FIG. 2 shows a flowchart of a method of training an apparatus for analyzing a medical product. FIG. 2 is also described with respect to the analysis of a vial of a liquid drug product. However, the method shown can also be used for any other medical product.

In a step 201, a first set of training images is created. This first set of training images comprises images showing vials that are free of defects and anomalies. Thus, these vials are vials that should not be sorted out during an analysis.

In a step 202, at least a first neural network of an inpainting autoencoder is trained with the first set of training images. The inpainting autoencoder is trained to reconstruct an image of a vial as it would look in a defect free and anomaly free state.

In this training, as described above with respect to reconstruction, each training image is reconstructed patch by patch. When assembling the reconstructed patches, both during training and later analysis, transitions at the edges of individual patches to neighboring patches may become visible since the individual patches are reconstructed independently. To reduce or avoid this, in the example shown, when training the at least one first neural network, reconstructed patches are each supplemented with corresponding frames, for example, in a width of a few pixels, of the respective patch from the original image.

In this way, the at least one first neural network is trained to reconstruct the patches in the respective edge regions as close as possible to the original. The cause for this is that by adding the frame from the original image when training the at least one first neural network, visible edge transitions are negatively evaluated when calculating loss metrics since a structural similarity between the reconstructed image and the original image is compared. Due to the negative evaluation, the evaluation of the reconstructions penalizes these visible edge transitions, whereby the at least one first neural network is trained to reduce these visible edge transitions by reconstructing the edge regions of the patches closer to the original image. In this way, better anomaly detection results can be achieved.

For example, the inpainting autoencoder is trained based on the following loss function:

$$\frac{1}{n}\sum_{i=1}^{n} \left(\lambda_{emph} \cdot \|P_i - \tilde{P}_i\| + (1 - \lambda_{emph}) \cdot \|X_{i,P} - \tilde{X}_{i,P}\| + \lambda_{ssim} \cdot (1 - SSIM(P_{i,pad}, \tilde{P}_{i,pad}))\right)$$

where $\lambda_{emph}, \lambda_{ssim} \in [0, 1]$ are scaling hyperparameters, $\|\cdot\|$ can be any norm, for example, $L_1$- or $L_2$-norm, and SSIM(x,y) is a measure of the structural similarity between two images x and y. $X_1, \ldots, X_n$ describes a set of training images with n images. For example, a grayscale image $X_i$ is considered as an m×m matrix with values in the interval [0,1], where m describes the side length of the image (analogous for non-square images also possible).

For each image $X_i$, let $P_i$ be the square submatrix describing the patch to be blackened and reconstructed. Accordingly, for each image $X_i$, $X_{i,P}$ describes a corresponding image where $P_i$ is blackened. The training images $X_{i,P}$ are fed to the at least one first neural network and the latter computes the reconstructed images $\tilde{X}_{i,P}$, containing the reconstructed patches $\tilde{P}_i$.

Furthermore, let $\tilde{P}_{i,pad}$ (respectively $P_{i,pad}$) be the reconstructed (respectively original) patch, to which a frame of a few pixels is added from the original image.

In a step 203, a second set of training images is created. This second set of training images includes results from the previously trained inpainting autoencoder. In other words, the second set of training images comprises such images in which a reconstruction defect has been made visible by the inpainting autoencoder. These may actually be defects or else anomalies (for example, reflections) that are not to be considered defects.

In a step 204, anomalies are labeled in the second set of training images. For this purpose, visible anomalies are categorized by an expert, in particular as to whether and where a defect is present, or whether and where an anomaly not to be considered a defect is present.

In a step 205, at least one second neural network of a binary classifier is trained with the labeled second set of training images. In this way, the binary classifier is trained to distinguish whether a known defect, a known anomaly that is not a defect, or an unknown anomaly is present in reconstruction defects visualized using the inpainting autoencoder.

Alternatively or additionally, the binary classifier may be based on other methods for interpreting the difference image created using the inpainting autoencoder. For example, the binary classifier may also use rule-based methods to determine whether or not an anomaly is a defect.

In a step 206, a first third set of training images is created. This first third set of training images includes images showing vials containing defects. These may be vials with incorrect fill levels, scratches, improperly seated caps, contaminants, bubbles forming in the liquid or the like. The defects in the first third set of training images are labeled by an expert.

In a step 207, at least one third neural network is trained for defect detection using the first third set of training images. The at least one third neural network is trained to detect the defects on the vials known from the first third set of training images.

In a step 208, a second third set and a third third set of training images are generated. The second third set of training images includes both training images showing defect-free vials and training images showing defective vials. For example, to achieve a good result, in the second third set of training images, the number of training images with defect vials and the number of training images with defect-free vials may be equal.

The third third set of training images includes such training images that show defect-free vials, but that were incorrectly detected as defective by the at least one third neural network.

In a step 209, the at least one third neural network is additionally trained based on the second and third third sets of training images to produce a weighted ensemble that forms the defect detector. This is referred to as "negative sampling" and "hard negative sampling." In this way, defect detection is improved with the defect detector.

In a step 210, weights are determined with which the results of the anomaly detection, the binary classifier and the defect detection are to be weighted against each other. The weightings can be chosen to achieve a sufficiently high quality assurance, but preferably not to determine vials without a defect as being defective.

Figure 3:
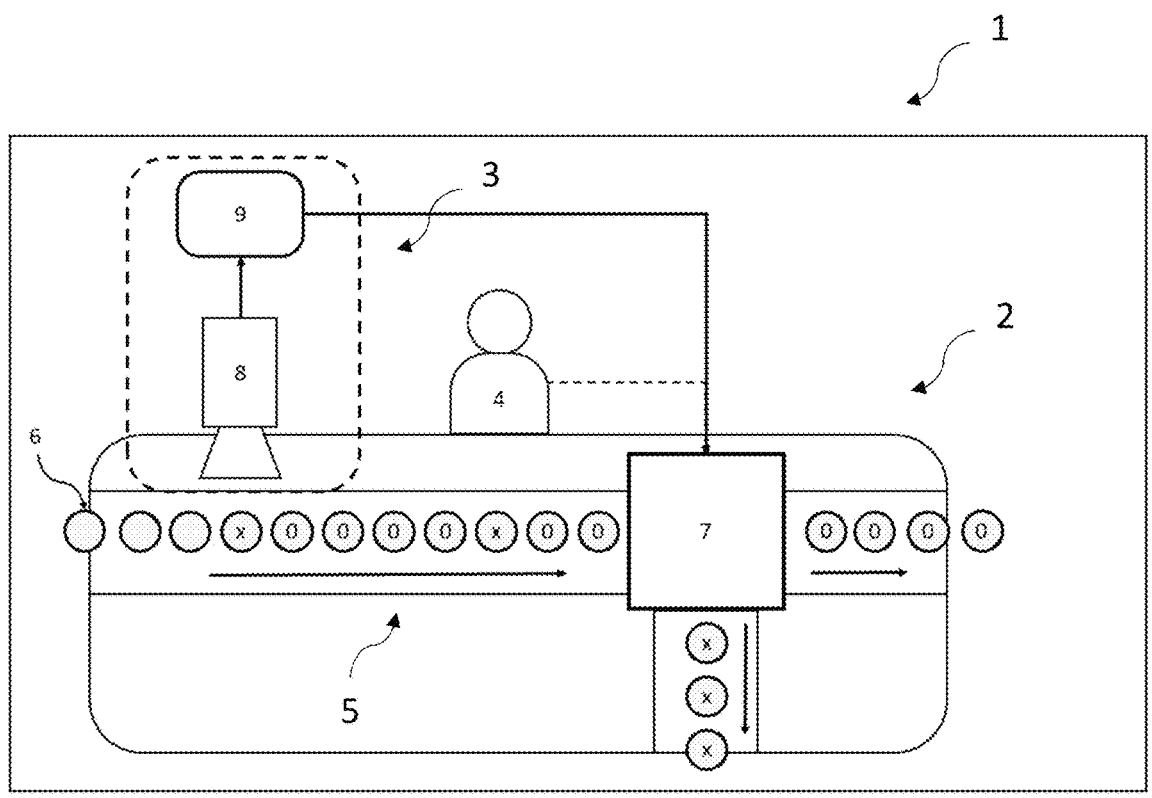
FIG. 3 shows a system comprising an inspection device and an apparatus for analyzing a medical product.

FIG. 3 shows a system 1 comprising an inspection device 2 and an apparatus 3 for analyzing a medical product. The inspection device 2 can be, for example, a commercially available inspection device 2 for such purposes, in the example shown, it is a semi-automatic inspection device 2. A worker 4 sits at a conveyor belt 5 on which vials 6 to be analyzed are transported past. The vials 6 can be inspected by the worker 4 and sorted out in a sorting machine 7 if they are defective vials. Defective vials 6 are marked with an "X" and defect-free vials 6 with an "O." The defect-free vials 6 are not sorted out by the sorting machine 7 and can be further processed in production.

The apparatus 3 for analyzing the vials comprises a camera 8 directed at the vials 6 to be analyzed. An image of a vial 6 to be analyzed is captured by the camera 8, and sent to a computer 9 of the apparatus 3. The image may also show multiple vials 6, in which instance the computer 9 may recognize the individual vials 6 in the image to evaluate each individually. Alternatively, multiple cameras may be provided. Alternatively, the camera 8 may also capture multiple images of each vial 6, for example, as they are rotated, to capture multiple perspectives of the vial 6, and thus provide even better results in the analysis.

The apparatus 3 is adapted to perform the method of analyzing medical products, for example, in the example as explained with reference to FIG. 1.

In the example shown, the apparatus 3 is a retrofittable apparatus that is connected to the inspection device 2. In particular, it is possible to attach the apparatus 3 shown here to the inspection device 2 without using any tools. In this way, the apparatus 3 can assist or replace the worker 4.

For example, the apparatus 3 is connected via optocouplers to a circuit system of the inspection device 2 to detect signals from the inspection device 2. In particular, this is suitable for tracking the vials 6 on the conveyor belt 5 so that subsequently, if a vial 6 has been identified by the apparatus 3 as being defective, a corresponding signal can be sent so that this vial 6 can be sorted out. Time stamps that can be assigned to a specific vial 6 are used for this purpose, for example. Since running times of the vials 6 in the inspection device 2 are known, the apparatus 3 can thus determine exactly when the vial 6, whose image was taken by the camera 8 at a certain point in time, has arrived at the sorting machine 7 to sort out this vial 6.

For this purpose, the computer 9 is also connected to the sorting machine 7, for example, also via optocouplers. Thus, the computer 9 can give a signal to the sorting machine 7 when a vial 6 is to be sorted out.

Alternatively, however, the analysis of a medical product can of course also be used in a fully automatic inspection device.

Figure 4:
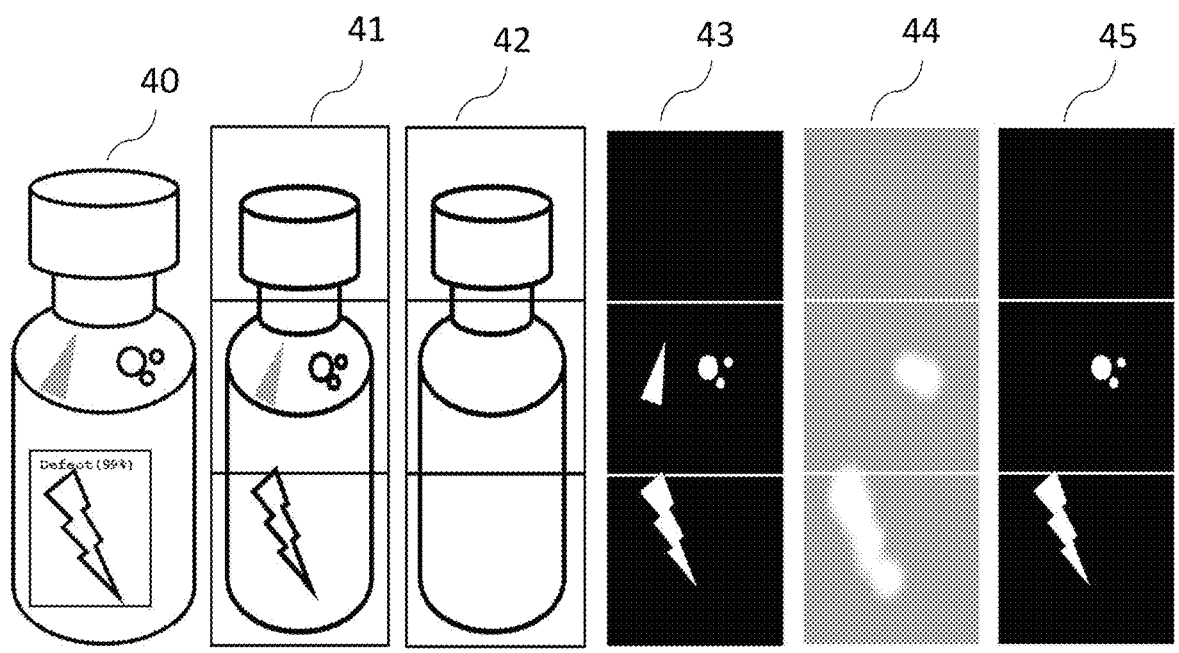
FIG. 4 shows various stages of analysis of a medical product according to an example.

FIG. 4 shows various stages of analysis of a medical product, in this example a vial. For example, the vial shown here was analyzed using the apparatus as described with reference to FIG. 3.

A first section 40 shows a result of a defect detector that has detected a defect with a probability of 99% in a lower region of the vial, and has provided it with a bounding box in which "Defect (99%)" is noted here. This vial was accordingly marked as "bad" by the defect detector.

A second section 41 shows a received image of the vial such as received by the apparatus described above.

A third section 42 shows an image of the vial reconstructed with an inpainting autoencoder.

A fourth section 43 shows a result of an anomaly detection, i.e., a reconstruction error. In particular, it can be seen that anomalies were detected in a middle region of the vial, as well as in the lower region. These are, among others, the bubbles visible in section 41 above the liquid. These bubbles were removed using the inpainting autoencoder so that they can be seen as reconstruction defects. These bubbles, for example, were not detected as defects by the defect detector and were not given a bounding box. Also detected as anomalies was a reflection in the area of the neck of the bottle, as well as the defect in the lower area.

A fifth section 44 shows an attention map of a binary classifier applied to section 43.

A sixth section 45 shows a reconstruction difference weighted based on the attention map. This weighted reconstruction difference is used to determine which portion of the vial is to be considered "bad" in the anomaly detection or binary classifier. In this example, this has been done for the lower and middle regions.

The invention claimed is:

1. A method of analyzing a product, the method comprising:
    receiving an image of the product;
    performing an anomaly detection on the received image using an inpainting autoencoder, wherein the inpainting autoencoder comprises at least one first neural network trained based on a first set of training images, and the first set of training images comprises a plurality of training images each showing a corresponding defect-free product;
    determining, using a binary classifier, whether or not a defect is present based on a result of the anomaly detection;
    performing defect detection on the received image using a defect detector, wherein the defect detector comprises at least one third neural network trained based on at least one third set of training images, and the at least one third set of training images comprises a plurality of training images each showing a corresponding defective product; and
    evaluating a result of the analysis of the received image based on a weighting of the results of the anomaly detection, the defect detection, and the binary classifier.

2. The method according to claim 1, wherein to perform the anomaly detection, the received image is divided into at least two sub-images, the anomaly detection is performed on the individual sub-images, and the binary classifier is applied to the results of the anomaly detection of the individual sub-images.

3. The method according to claim 1, wherein the defect detection further comprises determining a location of a detected defect in the received image and/or a type of the detected defect and/or a defect probability.

4. The method according to claim 1, wherein, in determining, using the binary classifier, whether or not a defect is present based on a result of the anomaly detection, the binary classifier evaluates, based on a reconstruction error of a version of the received image reconstructed by means of the inpainting autoencoder, whether the product represented in the received image is to be evaluated as defective or defect-free.

5. The method according to claim 1, wherein the binary classifier comprises at least a second neural network trained based on a second set of training images, and the second set of training images comprises results of the inpainting autoencoder; and
    the method further comprises: generating an attention map of the at least one second neural network when applying the binary classifier.

6. A method of training an apparatus for analyzing a product, the method comprising:
    creating a first set of training images, the first set of training images comprising a plurality of training images each showing a defect-free product;
    training at least a first neural network of an inpainting autoencoder based on the first set of training images;
    creating a binary classifier configured to identify whether or not a defect is present based on a result of an anomaly detection using the inpainting autoencoder;
    creating at least one third set of training images, wherein the at least one third set of training images comprises a plurality of training images each showing a defective product, and further at least one defect is marked in each training image of the third set of training images;
    training at least one third neural network of a defect identifier based on the at least one third set of training images; and
    determining a weighting by which to evaluate results of an anomaly detection by the inpainting autoencoder, a defect detection by the defect detector, and an application of the binary classifier.

7. The method to according claim 6, wherein creating the binary classifier comprises:
    creating a second set of training images, wherein the second set of training images comprises results of the inpainting autoencoder; and
    training at least a second neural network of the binary classifier based on the second set of training images.

8. The method according to claim 6, further comprising:
    creating a further third set of training images, wherein the further third set of training images comprises both a plurality of training images each showing a defective product and a plurality of training images each showing a defect-free product, and training the at least one third neural network is additionally performed based on the further third set of training images.

9. The method according to claim 6, further comprising:
creating a still further third set of training images, wherein the still further third set of training images comprises a plurality of training images each showing a defect-free product detected as defective by the previously trained at least one third neural network, and wherein the training of the at least one third neural network is additionally performed based on the still further third set of training images.

10. The method according to claim 6, wherein training the at least one first neural network of the inpainting autoencoder based on the first set of training images further comprises:
patchwise reconstructing a training image of the first set of training images;
adding, for a plurality of reconstructed patches, an edge region from a corresponding portion of the original training image; and
training the at least one first neural network of the inpainting autoencoder using the reconstructed patches of the training image, taking into account the added edge regions.

11. The method according to claim 1, wherein the product is a medical product.

12. The method according to claim 6, wherein the product is a medical product.

13. An apparatus that analyzes a product, wherein the apparatus is adapted to perform the method according to claim 1.

14. The apparatus according to claim 13, wherein the apparatus further comprises an imaging device that captures the image of the product; and/or the apparatus further comprises a control device adapted to cause a sorting out of a product detected as defective.

15. The apparatus according to claim 13, adapted to be retrofitted to a semi-automatic inspection device.

* * * * *